June 20, 1967 A. CAUVIN 3,326,501
SUSPENSION MEANS FOR TRANSVERSE AUTOMOBILE ENGINES
Filed July 26, 1965 3 Sheets-Sheet 1

Inventor
André Cauvin
Stevens, Davis, Miller & Mosher
Attorneys

United States Patent Office 3,326,501
Patented June 20, 1967

3,326,501
SUSPENSION MEANS FOR TRANSVERSE AUTOMOBILE ENGINES
André Cauvin, Port-Marly, France, assignor to Societe Anonyme Simca Automobiles, Paris, France
Filed July 26, 1965, Ser. No. 474,720
Claims priority, application France, July 29, 1964, 983,387
6 Claims. (Cl. 248—9)

ABSTRACT OF THE DISCLOSURE

A chassis having an engine transversely mounted thereon by means of three flexible fixing devices; two of which fixing devices are attached to side members of the chassis on one side of the axis of rotation of the engine, while the third fixing device is attached to a cross member of the chassis on the other side of the axis of rotation.

---

The present invention relates to suspension means for transversely arranged automobile engines, i.e. where the engine is arranged transversely of the longitudinal axis of the vehicle.

In vehicles of this type, the engine suspension is of particular importance because its function is not only to stop engine vibrations being transmitted to the body of the vehicle, but also to sustain the starting and bucking stresses, due to acceleration and braking.

It is already known to form a suspension by using rubber cushions, engaged between the engine and the chassis or body of the vehicle, at the fixing points on the engine. However, in the case of a transverse engine, the location and structure of these cushions must be studied with particular care, if it is desired that they fulfil their two main functions under the best possible conditions.

They must have a maximum separation in order to avoid the great constraints which would result from too short a distance between the axis of rotation of the engine, with respect to the chassis, and the engine fixing points.

On the other hand, it is advantageous that the cushions comprising the engine fixing members have a relatively good, but variable flexibility, whilst presenting a maximum resistance to wrenching and to clearance limited in the transverse direction, because a flexibility which is too great in this sense, could harm the good operation of the vehicle.

According to the invention, a transverse engine unit comprising an engine, clutch, a gear-box and a differential, is fixed at three points to the chassis or body of the vehicle, two of these points being situated on one side of the axis of rotation of the engine unit and the other point on the other side of said axis.

In one embodiment of the invention, the first two fixing devices connect the timing-case cover of the engine, and the gear box to the chassis or body of the vehicle, whilst the third fixing device situated at a point close to the centre of the engine, connects the casing of the latter to the chassis or body, by means of an intermediate arm.

The fixing devices are, constituted by blocks or cushions operating both in compression and in shear, their compression and shear characteristics being combined to that they have a variable flexibility.

Figure 1:
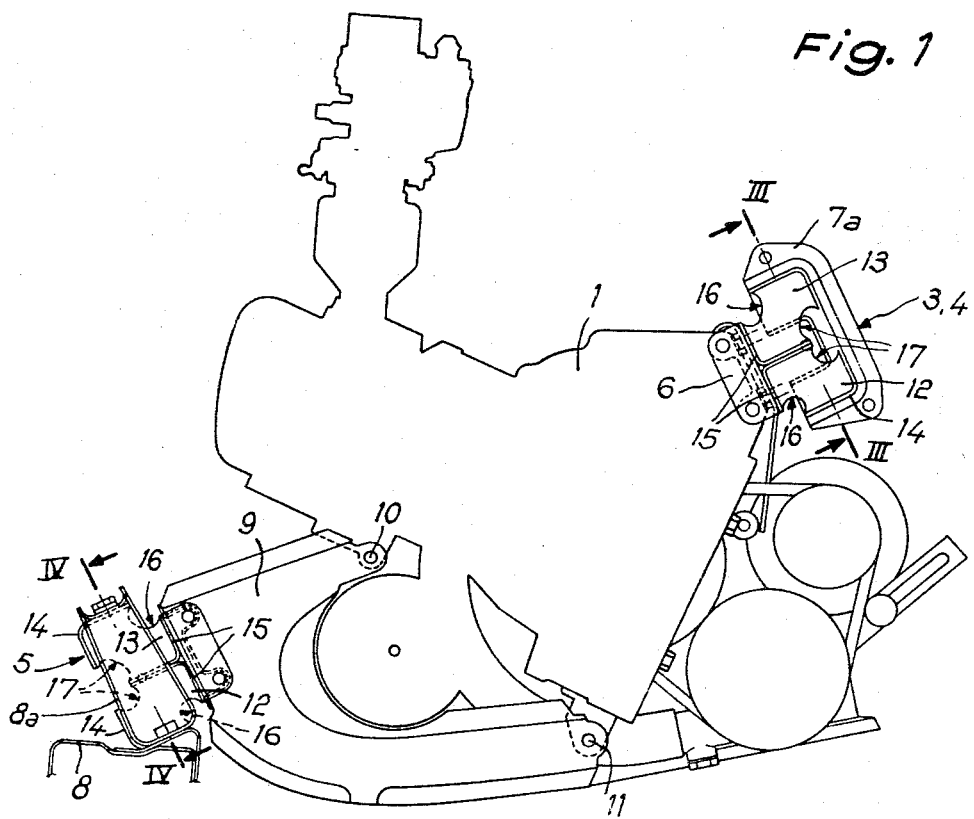
Figure 2:
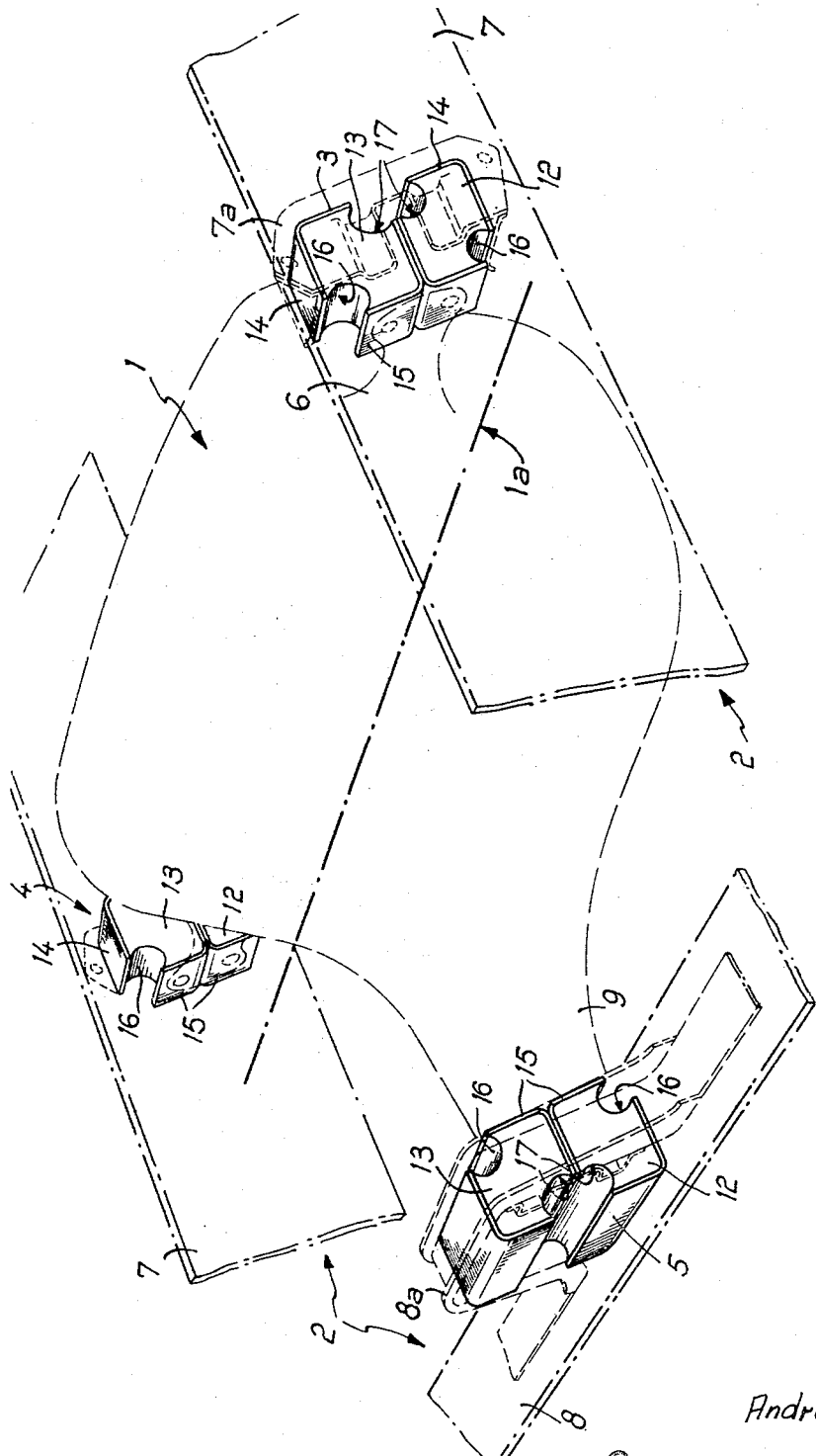
Figure 3:
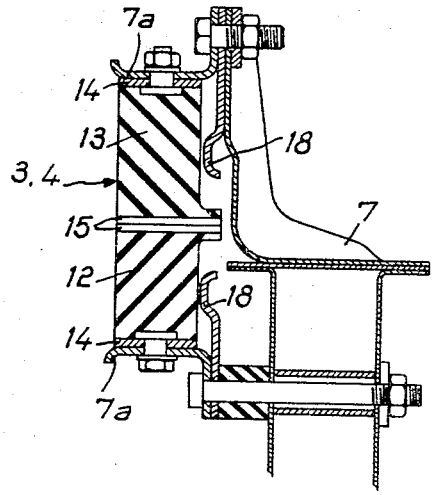
Figure 4:
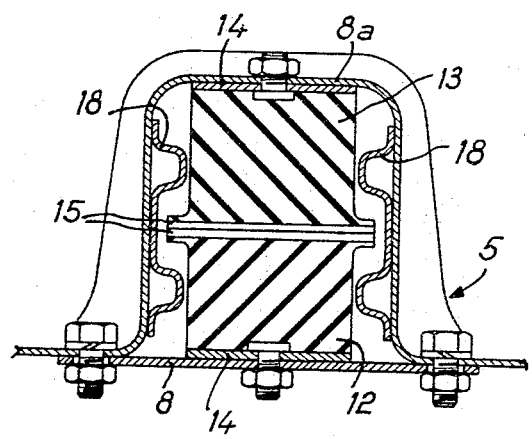

In order that the invention may be more clearly understood, reference will now be made to the accompanying drawings which show one embodiment thereof by way of example and in which:

FIGURE 1 shows a schematic side view of an engine unit suspension according to the invention, FIGURE 2 shows a perspective schematic showing of the placements of a suspension according to the invention, FIGURE 3 shows a section along the line III—III of FIGURE 1, and FIGURE 4 shows a section along the line IV—IV of FIGURE 1.

Referring now to the two drawings, as shown in FIGURES 1 and 2, the axis 1a of an engine unit 1, shown schematically, is arranged transversely with respect to the longitudinal axis of a motor vehicle, the chassis 2 of which is shown only schematically and partially by side members 7 and a cross member 8.

The engine unit which comprises an engine, gear box, a clutch and differential, all being integrated, is shown as being of the type having inclined cylinders, the cylinders, clutch and gear box being in line.

According to the invention, this engine unit 1 is fixed at three points 3, 4 and 5 to the chassis or body 2 of the vehicle. Two of these points 3, 4 are arranged for example towards the front of the vehicle. They are constituted by fixing devices 3, 4 situated on either side of the vehicle and which will be hereinafter described in greater detail, as well as by metal mounts 6, for example secured on the one hand to the timing case of the engine (not shown) and on the other hand to the gear box shell (not shown). The devices 3, 4 are on the other hand fixed by means of a strap 7a, to side members 7 of the chassis or body 2.

The rear fixing device 5 is connected on the one hand by means of a lug 8a to the cross member 8 of the chassis or body 2 and, on the other hand, to an arm 9 which is itself fixed to the engine unit 1, preferably towards the centre of the block, at two points 10 and 11, the distance therebetween being sufficient in order to give the assembly a maximum solidity.

It will be apparent that the distance between the axis passing through the fixing devices or supports 3, 4 and the fixing device or support 5 is large enough for the stresses between the engine 1 and the body 2 to be transmitted in the best possible conditions.

The constitution of the supports 3, 4 and 5 is as follows:

Each comprise two blocks or cushions 12, 13 of rubber or other flexible material arranged one above the other. Each block or cushion 12, 13 is arranged between two angle irons 14, 15 symmetrically opposite with respect to the axis of the block 12, 13. One angle iron 14 for each stress is fixed to the chassis or body 2 on a side member 7 or on a cross member 8, as the case may be and the other angle iron 15 is fixed to the engine unit by means of either the arm 6 or the arm 9, as the case may be. The angle irons 15 of each pair of cushions 12, 13 are juxtaposed so that one of the two flanges of each angle iron 15 touch one another by their backs.

The flexible blocks or cushions 12, 13 are fixed to the angle irons 14, 15 by adhesives or by any other means and they each have two grooves 16, 17 having the desired shape in order to enable them to operate in shear. These grooves 16, 17 are situated in the diagonal of the cushion 12 or 13, which diagonal is transverse with respect to that passing through the summits of the angle irons 14, 15. The cushions of each pair of cushions 12, 13 and the grooves 16, 17 which are arranged therein are arranged in such a manner that the grooves 17 are juxtaposed.

In other words, the section of the cushion 12, 13 in the vertical direction is such that they may operate simultaneously in the vertical direction, which is that of the transmission of the main stresses between the engine unit 1 and the body 2, the one hand in compression and on the other hand in shear. But it will be noted that their shear diminishes whilst their compression increases, the result being that the cushions 12, 13 have a variable flexibility acting to favour an increase in their suppleness over their useful crushing area.

In the lateral direction, the clearance of the rubber cushions 12, 13 is limited by plates 18 (FIGURES 3 and 4) arranged externally in the supports 3, 4 on each side of the support 5. All the cushions are prestressed.

In addition, the strap 8a fixing the cushions 12, 13 of the support 5 on the cross member 8, is mounted so that it exerts a prestress on the cushions 12, 13 of said support 5. It has been noted that the rubber which has thus been prestressed operates under the best conditions.

All the cushions must be on the same plane, being given the prestress which tend to drive them out.

Of course, the previously described embodiment of the suspension device shown in the accompanying drawing has been given only by way of example. Numerous modifications may be added to this device without departing from the scope of the invention as defined in the appended claims.

In a modification, two cushions which are coupled at the rear and which are identical to those arranged at the front, are used.

I claim:

1. In combination, a chassis of a vehicle, a suspension system and an engine unit transversely mounted within said chassis including two side members and a cross member, said suspension system comprising three fixing devices, means for securing each of said fixing devices to said engine unit and said chassis respectively, two of said devices being located on said side members and on one side of the rotation axis of said engine unit and the third of said devices being located on said cross member and on the otoher side of said rotation axis.

2. The combination of claim 1, wherein said first two fixing devices are connected respectively to the engine and the chassis by metal mounts which are substantially perpendicular to the longitudinal axis of the vehicle, whilst the said third fixing device connects said chassis to the engine by means of an arm located substantially parallel to the longitudinal axis of the vehicle and fixed to said engine, near the centre of the latter.

3. The combination of claim 1, wherein each of said fixing devices is constituted by two superposed flexible blocks slightly inclined with respect to the vertical, capable of operating both in compression and shear, each device having a pair of angle irons arranged between the blocks symmetrically opposite with respect to the axis of said blocks; each of said blocks having two grooves formed in the diagonal of the blocks; said diagonal being transversal with respect to a line passing through the summit of said angle irons.

4. The combination of Claim 3, wherein said angle irons and the grooves of each block of a pair are arranged so that one angle iron of the two irons of each first block of a pair is juxtaposed with an angle iron of the two angle irons of the other block of the pair a groove of one of the first blocks being juxtaposed with one of the grooves of the other block.

5. The combinataion of claim 4 in which said blocks are prestressed and all lie in the same plane.

6. The combinataion of claim 5 wherein the lateral clearance of said blocks is limited by plates arranged externally thereof.

References Cited

UNITED STATES PATENTS

| | | | |
|---|---|---|---|
| 2,076,034 | 4/1937 | Lampman | 248—7 |
| 2,257,804 | 10/1941 | Lord | 248—358 |
| 2,329,829 | 9/1943 | Clayton | 248—7 |

CHANCELLOR E. HARRIS, *Primary Examiner.*

JOHN PETO, *Examiner.*